United States Patent [19]
Derby et al.

[11] Patent Number: 5,274,625
[45] Date of Patent: Dec. 28, 1993

[54] TRAFFIC MEASUREMENTS IN PACKET COMMUNICATIONS NETWORKS

[75] Inventors: Jeffrey H. Derby, Chapel Hill, N.C.; Roch Guérin, Yorktown Heights, N.Y.; Levent Gün, Durham, N.C.

[73] Assignee: International Business Machines Corporation, Armonk, N.Y.

[21] Appl. No.: 942,873

[22] Filed: Sep. 10, 1992

[51] Int. Cl.$^5$ .................................... H04J 3/14
[52] U.S. Cl. ............................ 370/17; 370/94.1
[58] Field of Search ............... 370/13, 17, 60, 60.1, 370/79, 84, 94.1; 371/5.1, 5.5; 375/10; 364/550, 554, 565

[56] References Cited

U.S. PATENT DOCUMENTS

| | | | |
|---|---|---|---|
| 4,912,702 | 3/1990 | Verbiest | 370/94.1 |
| 5,121,383 | 6/1992 | Golestani | 370/94.1 |
| 5,132,966 | 7/1992 | Hayano et al. | 370/94.1 |
| 5,153,877 | 10/1992 | Esaki et al. | 370/94.1 |
| 5,179,549 | 1/1993 | Joos et al. | 370/17 |

OTHER PUBLICATIONS

CCITT Study Group XVIII, "Traffic Control and Resource Management in B-ISDN," *CCITT Recommendation* I.371, Feb. 1992.

CCITT Study Group XVIII, "Addendum to T1.606-" Flame Relaying Bearer Service ..., Recommendation T1S1/90-175R4, 1990.

R. Guerin and L. Gun, "A Unified Approach to Bandwith Allocation and Access Control in Fast Packet-Switched Networks," *Proceedings of the IEEE INFOCOM '92*, Florence, Italy, pp. 1-12, May 1992.

Primary Examiner—Douglas W. Olms
Assistant Examiner—Alpus H. Hsu
Attorney, Agent, or Firm—Gerald R. Woods

[57] ABSTRACT

A packet communications network relies on a few simple parameters to characterize the wide variety of traffic offered to that network, such as peak bit rate, mean bit rate and average packet burst length. A better representation of many types of traffic relies on an equivalent burst length which produces the same loss probability distribution, but assumes that the distribution is uncorrelated and exponential. Access control and bandwidth management based on such an equivalent burst length produces improved decisions due to the more accurate representation of the actual traffic distribution.

15 Claims, 5 Drawing Sheets

EQUIVALENT BURST LENGTH DETERMINATION

PACKET COMMUNICATIONS NETWORK

TYPICAL PACKET DECISON POINT

BUFFER UTILIZATIONS FOR DIFFERENT PROCESS DISTRIBUTIONS

EQUIVALENT BURST LENGTHS FOR DIFFERENT PROCESS DISTRIBUTIONS

APPROXIMATE AND REAL BUFFER UTILIZATIONS
FOR DIFFERENT PROCESS DISTRIBUTIONS

EQUIVALENT BURST LENGTH DETERMINATION

TRAFFIC MEASUREMENTS IN PACKET COMMUNICATIONS NETWORKS

TECHNICAL FIELD

This invention relates to packet communication networks and, more particularly, characterizing the traffic offered to such networks to accurately capture all of the distributional and correlational effects of complex traffic with a very few, easily acquired traffic parameters which can be readily used to bandwidth management procedures.

BACKGROUND OF THE INVENTION

Modern high speed networking protocols provide both quality of service and bandwidth guarantees to every transport connection established across the network. Such guarantees are achieved by means of an integrated set of procedures. One of the major inputs to this set of integrated procedures is an accurate but simple characterization of the connection traffic offered to the network.

In such high speed packet switching networks, many different classes of traffic share the common transmission resources. The network must therefore be capable of providing traffic generated by a wide range of multimedia services such as text, image, voice and video. The traffic characteristics of such different sources vary dramatically from one another and yet the network must provide a bandwidth and a quality of service guaranteed for each and every connection that is established across the network. It is therefore essential to provide a technique for characterizing the traffic on a high speed switching network which is, on the one hand, simple and easy to measure or calculate and, on the other hand, which captures all of the significant parameters of each of the widely diverse traffic sources.

Several standards bodies have heretofore proposed to characterize the traffic on each connection in a packet communications network utilize the following descriptors:

R: The peak pulse rate of the connection, in bits per second (bps).

m: The mean pulse rate of the connection, in bits per second (bps).

b: The duration of a burst period, in seconds.

These parameters are, for example, defined in CCITT Study Group XVIII, "Traffic Control and Resource Management in B-ISDN," *CCITT Recommendation* 1.371, February 1992, and CCITT Study Group XVIII, "Addendum to T1.606—"Frame Relaying Bearer Service . . . ", Recommendation T1S1/90-175R4, 1990. Bandwidth management procedures based on this set of traffic-characterizing parameters for operating a packet communications network are disclosed in "A Unified Approach to Bandwidth Allocation and Access Control in Fast Packet-Switched Networks," by R. Guerin and L. Gun *Proceedings of the IEEE INFOCOM '92,* Florence Italy, pages 1-12, May 1992, and the copending application Ser. No. 07/932,440, filed Aug. 19, 1992, and assigned to applicants' assignee.

These prior art bandwidth management techniques utilize these three descriptors to model user traffic by means of a two-state on/off fluid-flow model, by interpreting the b parameter as the average burst duration. In this model, the traffic source is either idle and generating no data, or active and transmitting data at its peak rate. It is assumed that the idle periods and the burst lengths are exponentially distributed and are independent from each other. Under these assumptions, the three descriptors R, m, and b have been used to characterize the source statistics and have been used to derive bandwidth management algorithms which are relatively easy to implement. When the idle periods and burst lengths are in fact exponentially distributed and independent from each other, these three descriptors do indeed fully characterize the source statistics and permit accurate bandwidth management.

Unfortunately, the actual user traffic offered to such packet communications systems is typically very complex and its impact on the performance of the network cannot be accurately predicted by the use of these three descriptors alone. Even when using the on/off fluid characterization of the traffic, the real traffic may have far more complex distributional characteristics than the simple exponential on/off model assumed in the prior art systems. In general, the burst lengths and the duration of the idle periods may have arbitrary distributions and may also have distributions which are correlated with each other. If these arbitrary, possibly correlated, distributions are not captured in the characterization of the traffic, the value and success of the bandwidth management procedures based upon the simplified exponential on/off model will be heavily impacted and may result in entirely inappropriate bandwidth management decisions. Furthermore, even if the actual traffic generation process does have exponential on and off time distributions which are independent from each other, the fluid-flow approximation ignores the microscopic stochastic representation of the underlying point process and focuses on the macroscopic correlations. That is, the fluid-flow approximation ignores such things as packet length distributions, inter-arrival time distributions within a burst, and so forth, and relies on such parameters as the length of the bursts and successive idle periods. With such a fluid-flow model, the same queuing behavior is obtained regardless of the packet length distributions. A more accurate (albeit more complex) characterization of the underlying point process will indeed show the effects of second order stochastic behavior on the queuing behavior of the packets at the switches in the network. A serious problem in the management of packet networks, therefore, is to better characterize the actual traffic process on the connections so as to permit more accurate and more useful management procedures.

In addition to requiring more accurate characterizations of the traffic entering a packet network, it is also necessary to identify the parameters of this characterization through simple procedures applied at the access point to the network. More specifically, it is necessary to provide a simple measurement technique for identifying parameters that accurately represent the essential characteristics of the actual traffic on a connection. Such characteristics must be available sufficiently rapidly that they can be used to drive the bandwidth management procedures which will produce useful results in time to operate the network.

SUMMARY OF THE INVENTION

In accordance with the illustrative embodiment of the present invention, the key distributional and correlational characteristics of a complex traffic process is approximated by a few, simple traffic descriptors which have already been rigorously defined by various standards bodies. More particularly, the average duration parameter b is improved substantially by upgrading the estimation of the average duration b to obtain an equivalent burst length $b_{eq}$. Unlike the prior art approach, where the average duration b is observed directly, the equivalent burst length $b_{eq}$ is calculated from the actual queue length distribution $F(Z_0)$, which can be observed directly at the packet network access point, sometimes more readily than the average burst duration b itself.

The equivalent burst length is utilized in the present invention, along with the peak and mean bit rates of the packet source, for bandwidth management in the packet communications network. The improved value of the equivalent burst length results directly in improvements in the operation of the previously known bandwidth management algorithms based on these parameters. That is, the new characterization of the source traffic provided by the present invention results in the ability to use many of the previously designed traffic management algorithms without modification, and, at the same time, produce better results than was possible with the use of the simple average burst length parameter. The improvement flows directly from utilizing the effect of the traffic distribution, that is, the buffer loss distribution, rather than relying on a burst length measurement which assumes a particular distribution of such burst lengths. The actual burst length distributions can be distinctly different than the assumed on/off uncorrelated exponential distribution, and, furthermore, the distribution can also vary over time, even when the average burst length duration remains constant.

The equivalent burst length $b_{eq}$ in accordance with the present invention is, in general, different from the average burst length b and, moreover, different in such a way as to better capture more of the distributional and correlational effects of complex traffic. The use of the equivalent burst length $b_{eq}$ therefore improves the bandwidth management algorithms utilizing this burst length as one of the basic characterizations of the traffic. Previously available management algorithms can therefore be used to produce improved management results. Moreover, the improved characterization of the incoming traffic relies on a simple measurement taken at the network access point, thereby simplifying the implementation of such congestion control algorithms and rendering periodic updating of the characterization parameters more readily implementable.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
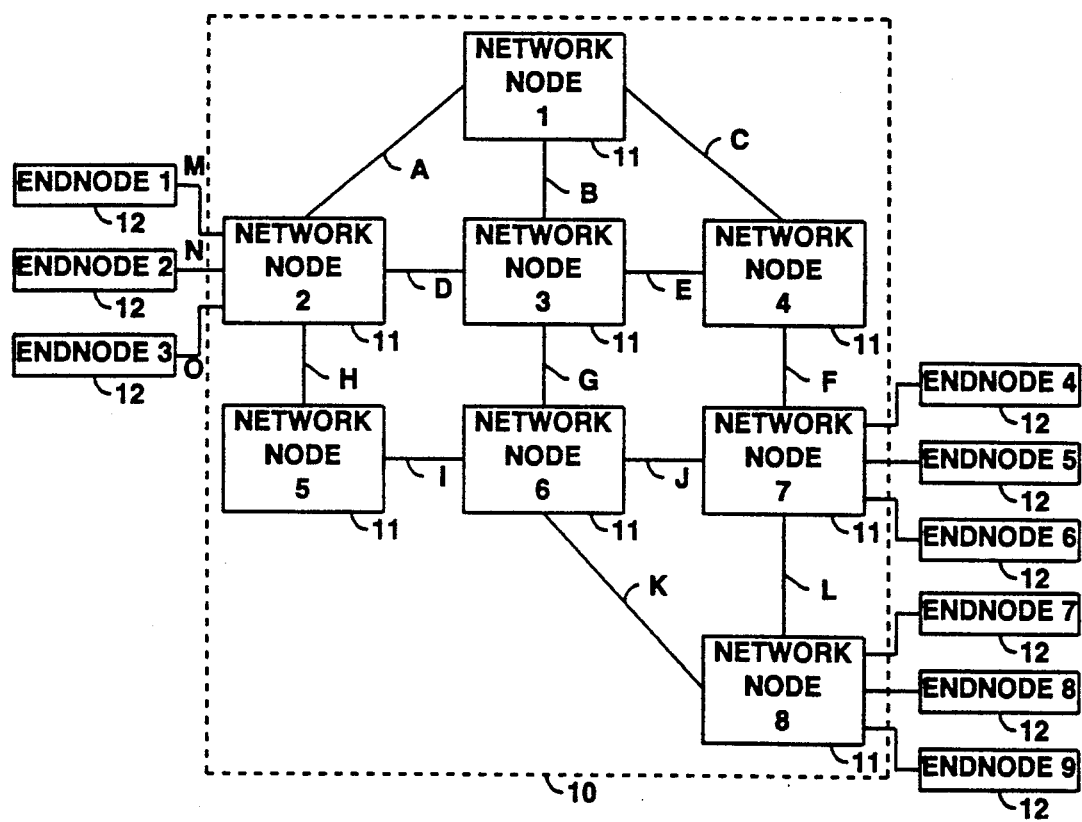
FIG. 1 shows a general block diagram of a packet communications system in which the improved access control mechanisms of the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as decision points within the node. The network nodes 11 each comprise one or more decision points within the node, at which incoming data packets are selectively routed on one or more of the outgoing communication links terminated within that node or at another node. Such routing decisions are made in response to information in the header of the data packet. The network node also provides ancillary services such as the calculation of routes or paths between terminal nodes, providing access control to packets entering the network at that node, and providing directory services and maintenance of network topology data bases used to support route calculations and packet buffering.

Each of end nodes 12 comprises either a source of digital data to be transmitted to another end node, a utilization device for consuming digital data received from another end node, or both. Users of the packet communications network 10 of FIG. 1 utilize an end node device 12 connected to the local network node 11 for access to the packet network 10. The local network node 11 translates the user's data into packets formatted appropriately for transmission on the packet network of FIG. 1 and generates the header which is used to route the packets through the network 10.

In order to transmit packets on the network of FIG. 1, it is necessary to calculate a feasible path or route through the network from the source node to the destination node for the transmission of such packets. To avoid overload on any of the links on this route, the route is calculated in accordance with an algorithm that insures that adequate bandwidth is available for the new connection, using statistical multiplexing techniques. That is, given the statistical properties of each data source, a plurality of signals from such sources are multiplexed on the transmission links A-L, reserving sufficient bandwidth to carry each signal if that signal stays within its statistically described properties. One such algorithm is disclosed in the copending application, Ser. No. 07/874,917, filed Apr. 28, 1992, and assigned to applicants' assignee. Once such a route is calculated, a connection request message is launched on the network, following the computed route and updating the bandwidth occupancy of each link along the route to reflect the new connection.

Figure 2:
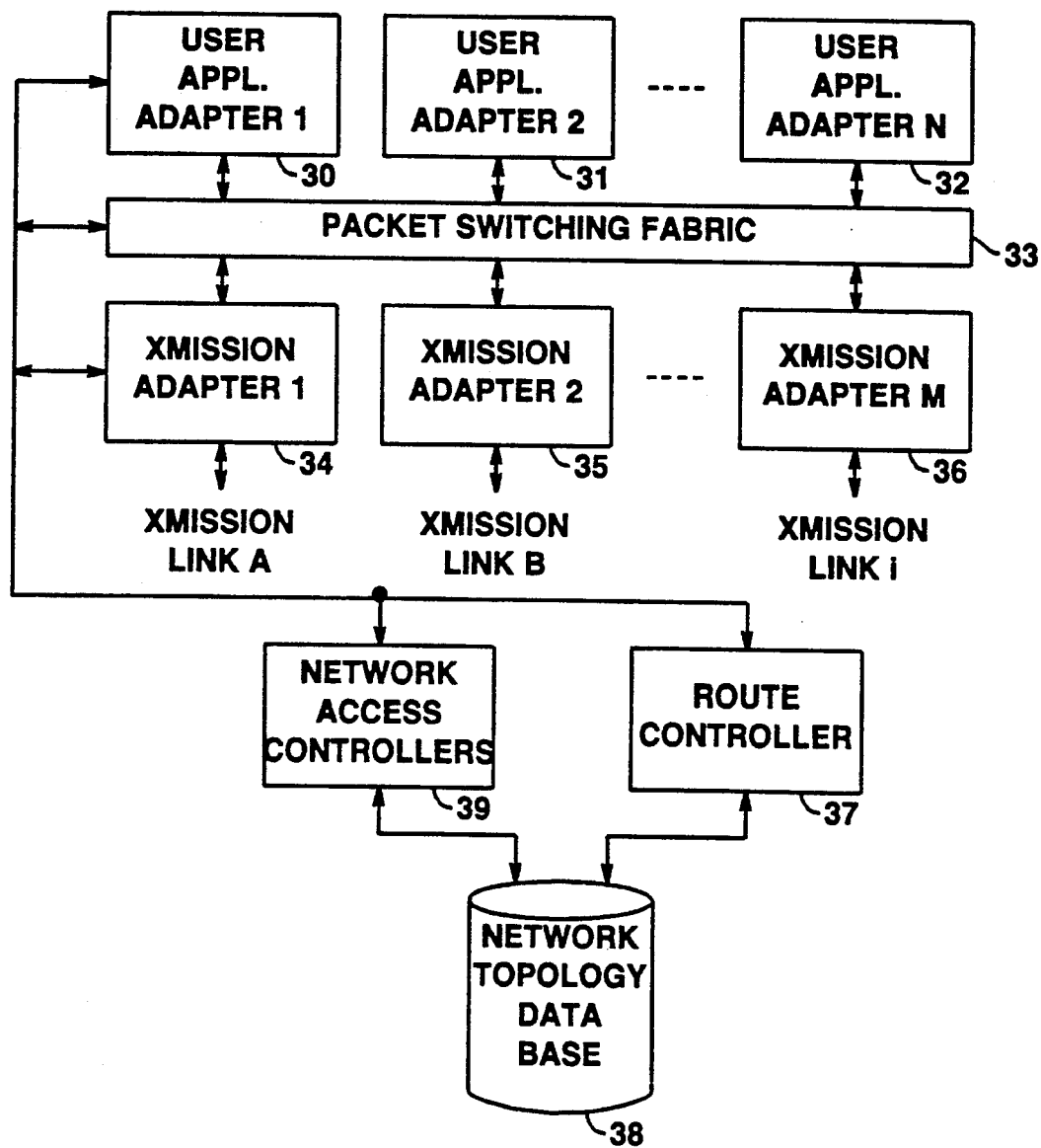
FIG. 2 shows a more detailed block diagram of a typical decision point in the network of FIG. 1 at which packets may enter the network and at which the traffic characterization parameters of the packet source would be determined to control the access to the network.

In FIG. 2 there is shown a general block diagram of a typical packet network decision point such as is found in the network nodes 11 of FIG. 1. The decision point of FIG. 2 comprises a high speed packet switching fabric 33 onto which packets arriving at the decision point are entered. Such packets arrive over transmission links via transmission adapters 34, 35, . . . , 36, or originate in user applications in end nodes via application adapters 30, 31, . . . , 32. It should be noted that one or more of the transmission adapters 34–36 can be connected to intranode transmission links connected to yet other packet switching fabrics similar to fabric 33, thereby expanding the switching capacity of the node. The decision point of FIG. 2 thus serves to connect the packets arriving at the decision point to a local user (for end nodes) or to a transmission link leaving the decision point (for network nodes and end nodes). The adapters 30–32 and 34–36 include queuing circuits for queuing packets prior to or subsequent to switching on fabric 33. A route controller 37 is used to calculate optimum routes through the network for packets originating at one of the user application adapters 30–32 in the decision point of FIG. 2. Network access controllers 39, one for each connection originating at the decision point of FIG. 2, are used to regulate the launching of packets onto the network so as to prevent congestion. That is, if the transient rate of any connection exceeds the statistical values assumed in making the original connection, the controllers 39 slow down the input to the network so as to prevent congestion. Both route controller 37 and access controllers 39 utilize the statistical description of the new connection in calculating routes or controlling access. These descriptions are stored in topology data base 38. Indeed, network topology data base 38 contains information about all of the nodes and transmission links of the network of FIG. 1 which information is necessary for controller 37 to operate properly.

The controllers 37 and 39 of FIG. 2 may comprise discrete digital circuitry or may preferably comprise properly programmed digital computer circuits. Such a programmed computer can be used to generate headers for packets originating at user applications in the decision point of FIG. 2 or connected directly thereto. Similarly, the computer can also be used to calculate feasible routes for new connections and to calculate the necessary controls to regulate access to the network in order to prevent congestion. The information in data base 38 is updated when each new link is activated, new nodes are added to the network, when links or nodes are dropped from the network or when link loads change due to the addition of new connections. Such information originates at the network node to which the resources are attached and is exchanged with all other nodes to assure up-to-date topological information needed for route and access control calculations. Such data can be carried throughout the network on packets very similar to the information packets exchanged between end users of the network.

The incoming transmission links to the packet decision point of FIG. 2 may comprise links from local end nodes such as end nodes 12 of FIG. 1, or links from adjacent network nodes 11 of FIG. 1. In any case, the decision point of FIG. 2 operates in the same fashion to receive each data packet and forward it on to another local or remote decision point as dictated by the information in the packet header. The packet network of FIG. 1 thus operates to enable communication between any two end nodes of FIG. 1 without dedicating any transmission or node facilities to that communication path except for the duration of a single packet. In this way, the utilization of the communication facilities of the packet network is optimized to carry significantly more traffic than would be possible with dedicated transmission links for each communication path.

The access controllers 39 of FIG. 2 operate to control the access of packets to the network in such a fashion as to eliminate or vastly reduce the possibility of congestion in the network due to temporary changes in the behavior of the corresponding packet sources. In order to accomplish this purpose, controller 39 must determine a set of statistical characteristics that capture the main elements of the behavior of the packet source. It has been found that peak bit rate, mean bit rate and average burst duration (R, m and b, respectively) are one such set of characteristics and many access control schemes have been designed utilizing these characteristics. Such control schemes are shown, for example, in "A Unified Approach to Bandwidth Allocation and Access Control in Fast Packet-Switched Networks," by R. Guerin and L. Gun *Proceedings of the IEEE INFOCOM '92*, Florence, Italy, pages 1–12, May, 1992 and copending patent application, Ser. No. 07/932,440, filed Aug. 19, 1992, and assigned to applicants' assignee.

Prior art characterizations of the burst length have presumed that the distribution of the bursts over time was on/off and exponential and the access control schemes have been based on traffic behavior with this assumed burst distribution. Typically, the actual distribution of bursts in packet sources for modern packet communications networks varies widely and the presumed exponential distribution is often an inaccurate representation of the actual distribution of packet bursts. Such inaccuracies in the presumed burst distribution, in turn, result in inappropriate or inadequate design of the network access buffers, or in traffic management decisions producing unintended results, particularly in terms of the probability of loss of packets due to buffer overflow. This effect can be better seen in FIG. 3.

Figure 3:
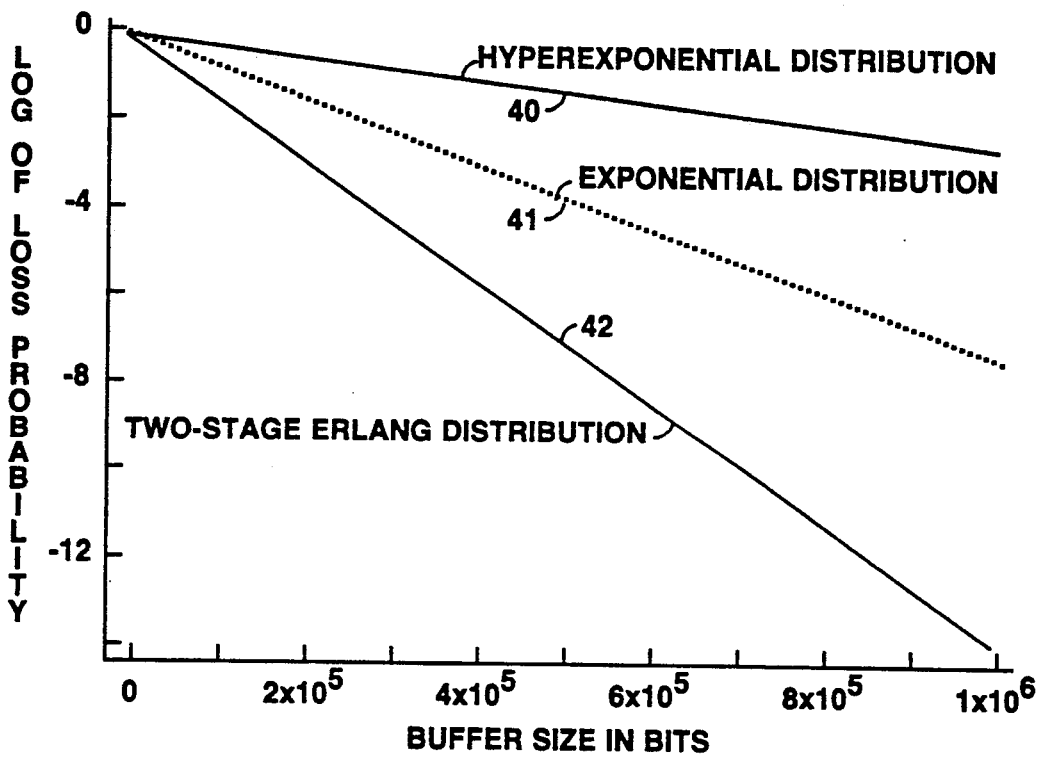
FIG. 3 shows a graphical representation of the buffer occupancy probabilities at typical transmission adapter such as adapters 34-36 of FIG. 2 under varying assumptions of burst length distributions but constant average durations, illustrating the inability of the prior art average burst length duration to accurately characterize complex incoming traffic.

In FIG. 3 there is shown a graphical representation of the buffer occupancy distribution at a typical transmission adapter such as adapters 34–36 of FIG. 2 for packet sources with different burst length distributions but with identical peak rates, mean rates and average burst lengths. In FIG. 3, curve 41 shows the relationship between packet loss probability and buffer length for the prior art assumption of an on/off, independent exponential distribution of burst and idle periods. Curve 40 shows the same relationship between loss probability and buffer size for a hyperexponential distribution of on time and an exponential distribution of off times, and having the same peak rate, mean rate and average burst length. Similarly, curve 42 show this relationship for a two-stage Erlang distribution of both on and off times, and also having the same peak rate, mean rate and average burst length. It is apparent that the loss probability is heavily dependent upon the actual distribution of the burst and idle periods in the incoming packet train. Moreover, it is likewise apparent that the use of the prior art average burst length fails totally to capture very significant effects of burst distribution departing substantially from the assumed on/off exponential distribution. More particularly, relying on the assumed exponential distribution in managing the access of a packet source to the network can result in unpredictable loss probabilities and hence better than or worse than expected performance.

More particularly, if it is assumed that the capacity of a transmission facility is given by C, the complementary distribution of the steady-state queue length process Z in the network access buffer can be represented by the distribution function $F(z)=P(Z>z)$, assuming that the mean bit rate is less than the capacity of the transmission channel (i.e., $m<C$), where Z is the queue length process taking place in this buffer. FIG. 3 plots $\log_{10} F(z)$ for the three different distributions having the same traffic descriptors (R=10 Mbps, m=2 Mbps and b=2 milliseconds). The transmission capacity C is selected as 2.5 Mbps and thus the transmission facility is 80% utilized. It is assumed in FIG. 3 that distribution 40 has burst durations exponentially distributed with $\mu_1=100$ sec$^{-1}$ with a probability of 0.1, and has idle period durations exponentially distributed with $\mu_2=900$ sec$^{-1}$ with a probability of 0.9, thus providing an average burst length b of 2 milliseconds in either case. The average off duration is then equal to 8 milliseconds ($\lambda=125$ sec$^{-1}$), so that the mean arrival rate m is 2 Mbps. For the distribution of curve 42, $\mu=1000$ sec$^{-1}$ and $\lambda=250$ sec$^{-1}$ which also yields the same m and b values. It is evident from FIG. 3 that, even though these three processes have identical traffic descriptors (R, m, b), their impact on the queue length process is quite different.

For the prior art assumption of exponential on/off distribution of packet bursts, the distribution function F(z) can be obtained from the following simple closed form expression, assuming an infinite length buffer:

$$F(z) = \frac{m}{C} e^{-\frac{z\Delta}{b}}, \text{ where } \Delta = \frac{R(C-m)}{(R-m)(R-C)C} \quad (1)$$

If, as was done in the prior art, the parameters (R, m, b) are observed and the exponential on/off model is assumed for the arrival process, the assumed distribution can be very misleading. The system of the present invention introduces the concept of "equivalent burst length" ($b_{eq}$) which attempts to approximate the non-exponential distributions of FIG. 3 by two different exponential on/off processes with the same mean and peak rates, but with different equivalent burst lengths $b^1_{eq}$ and $b^2_{eq}$.

In accordance with the illustrative embodiment of the present invention, the equivalent burst length $b_{eq}$ is calculated from a knowledge of the actual value of the queue length distribution $F(z_0)$ at some queue length $z_0$. In many applications, measuring $F(z_0)$ is easier than directly measuring the average burst length b. For example, in an access control system for a high speed packet network, $F(z_0)$ may represent the probability of running out of tokens at the leaky bucket when the token generation rate is C and the token buffer size is $z_0$. The design and arrangement of such admissions buffers are shown in the copending application, Ser. No. 07/943,097, filed Sep. 10, 1992, assigned to applicants' assignee. In general, the leaky bucket operates to permit packets to be introduced into the packet network without significant delay so long as the packet arrival process remains within the statistical parameters initially describing that process. If the packet arrival process falls outside of these parameters, the leaky bucket operates to alter the accessibility of the network, usually by tagging the packets not within the parameters. The leaky bucket utilizes a token pool into which tokens are entered at a fixed rate. A packet cannot be transmitted until sufficient tokens are available to accommodate the packet. Packets delayed due to lack of sufficient tokens can be marked for special treatment. Such marking is known as violation tagging.

In accordance with the present invention, the process Z of equation (1) is approximated by a process $Z_0$, which is the steady state fluid level if the input process were an exponential on/off process with parameters (R, m, $b_{eq}$), i.e., an exponential process having an average burst length of $b_{eq}$ and having the same mean and peak rates. The equivalent mean burst length $b_{eq}$ is selected such that $F(z_0)=P(Z_0>z_0)=F_0(z_0)$. Solving equation (1) for the equivalent burst length $b_{eq}$ when using the actual queue length distribution $F(z_0)$, the equivalent mean burst length (the modified mean on period $b_{eq}$) is easily obtained as:

$$b_{eq} = \frac{z_0 \Delta}{\ln\left(\frac{m}{CF(z_0)}\right)}. \quad (2)$$

This value of $b_{eq}$ clearly distinguishes between the three distributions shown in FIG. 3.

Figure 4:
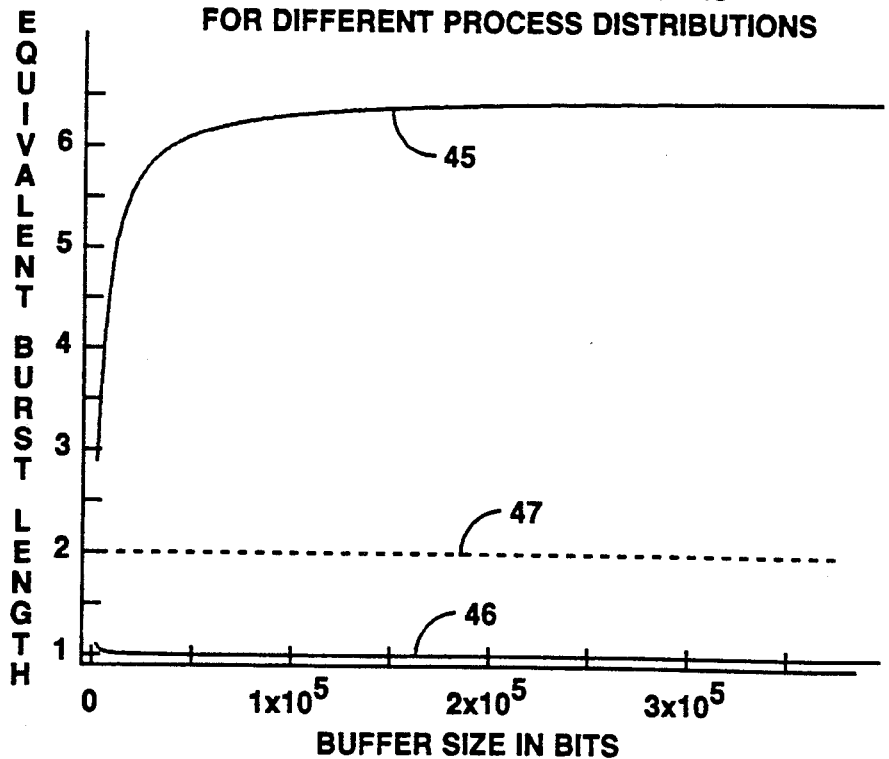
FIG. 4 shows a graphical representation of the equivalent burst lengths versus access buffer size under the same assumptions of burst length distributions utilized in FIG. 3.

More particularly, FIG. 4 shows a graphical representation of the equivalent burst length, calculated according to equation (2), versus the buffer size in bits ($z_0$). Curve 45 corresponds to the hyperexponential distribution 40 of FIG. 3, curve 46 corresponds to the two-stage Erlang distribution 42 of FIG. 3 and dashed curve 47 corresponds to the average burst length corresponding to the exponential distribution 41 of FIG. 3. First note that the value of $b_{eq}$ remains relatively constant when $F(z_0) < 10^{-2}$. Also note that $b^1_{eq} > b > b^2_{eq}$ for all values of $z_0$. This is attributable to the longer queue lengths required to handle the high variability of the on and off times in the hyperexponential distribution 40 of FIG. 3, and the shorter queue lengths required to handle the low variability of the on and off time in the two-stage Erlang distribution 42 of FIG. 3. In selecting the value of $b_{eq}$, the loss probability $F(z_0)$ is approximately equal to 0.01 for all processes, producing a value $b^1_{eq}$ of 6.26 milliseconds (distribution 40) and a value $b^2_{eq}$ of 1.01 milliseconds (distribution 42). With these values, the distributions of FIG. 3 are precisely tracked and accurate management of the traffic access can be accomplished.

If it is assumed that the buffer has a finite capacity X, equation (1) must be expanded to:

$$F(z) = \frac{m(R-m)e^{-z\frac{\Delta}{b}} - m(R-C)e^{-X\frac{\Delta}{b}}}{C(R-m) - m(R-C)e^{-X\frac{\Delta}{b}}}, \quad (3)$$

where $0 \leq z \leq X$. Note that equation (3) reduces to equation (1) when $X = \infty$. Using the same reasoning as was used in connection with equation (1), the equivalent burst length $b_{eq}$ is $$b_{eq} = \frac{z_0 \Delta}{\ln\left(\frac{R(C-m) + mF(z_0)(R-C)}{F(z_0)(R-m)C}\right)}. \quad (4)$$

It should be noted that it is unreasonable to expect the single number $b_{eq}$ to accurately capture all of the complex distributional and correlational characteristics of a given source. It is nevertheless true that the equivalent burst length $b_{eq}$ is a simple and very practical approach to capturing sufficient information about the impact of the arrival process on the queuing process to be able to distinguish between the radically different arrival process distributions of FIG. 3. This is accomplished by estimating the tail (steady state) behavior of $F(z)$, and not necessarily using the low order moments such as the mean or variance of Z. If $F(X)$ is overflow probability of the traffic from a buffer of size X, it is highly desirable to select $z_0$ close to X since the resulting value of $b_{eq}$ carries more information about the tail of $F(z)$ and hence could result in better estimates of the required bandwidth allocation. On the other hand, as the measured values of $z_0$ get smaller, the error in the measurement gets larger. As illustrated in FIG. 4, when the input process is more regular (curve 42 in FIG. 3), the approximation to $b_{eq}$ is much less sensitive to the choice of $z_0$ (curve 46 in FIG. 4) and the approximation provides a much better match to the true distribution (curve 42 in FIG. 5), although the approximation is quite accurate for other distributions (such as curve 40 in FIG. 3 and the corresponding curve 40 in FIG. 5).

Figure 5:
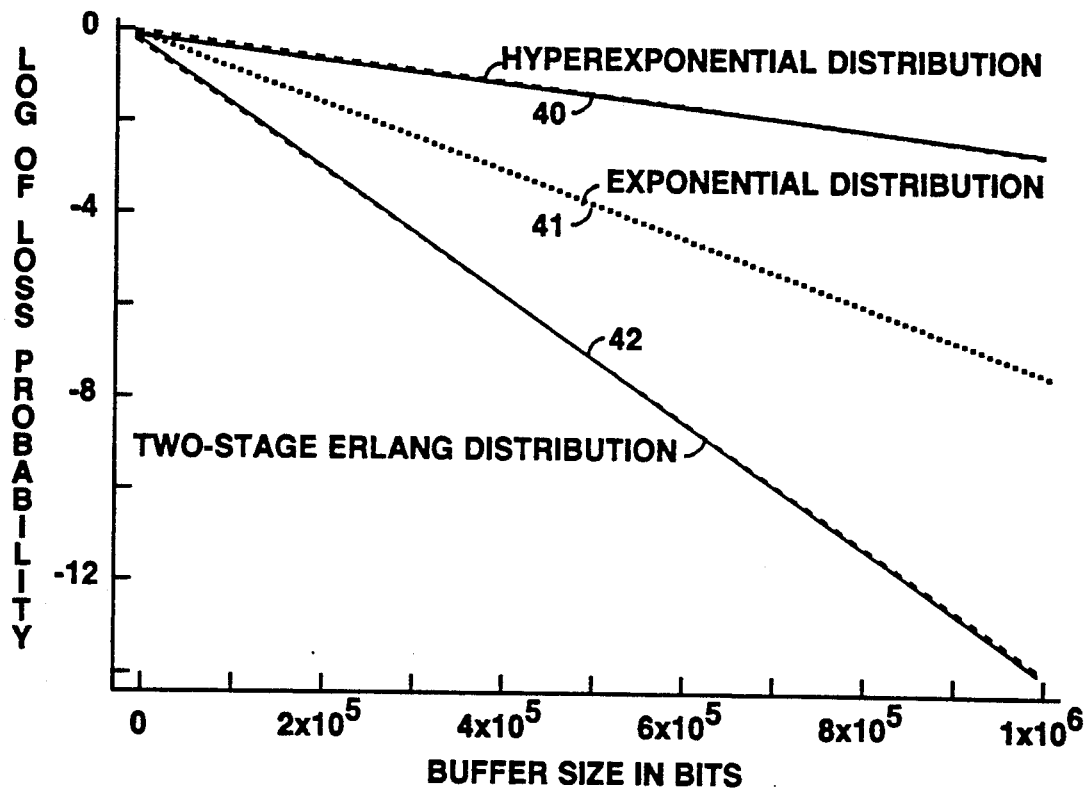
FIG. 5 shows a graphical representation of the buffer occupancy probabilities under varying assumptions of burst length distributions as shown in FIG. 3 with the buffer occupancy probabilities using the equivalent burst lengths of the present invention superimposed thereon, showing the high level of accuracy of the approximation when using the equivalent burst length of the present invention.

In FIG. 5 there is shown the buffer occupancy distributions of FIG. 3 with the approximate distributions, calculated using the equivalent burst lengths suggested in FIG. 4, superimposed thereon. That is, the hyperexponential distribution 40 and the two-stage Erlang distribution 42 (in solid lines) have superimposed thereon (in dashed lines) the approximate distributions generated by using the equivalent burst lengths of FIG. 4. It can be seen that the correspondence between the approximate distributions and the actual distributions are very close. More significantly, these equivalent burst length approximations are significantly more accurate than the exponential distribution 41 used in the prior art to approximate all of the possible input process distributions.

Figure 6:
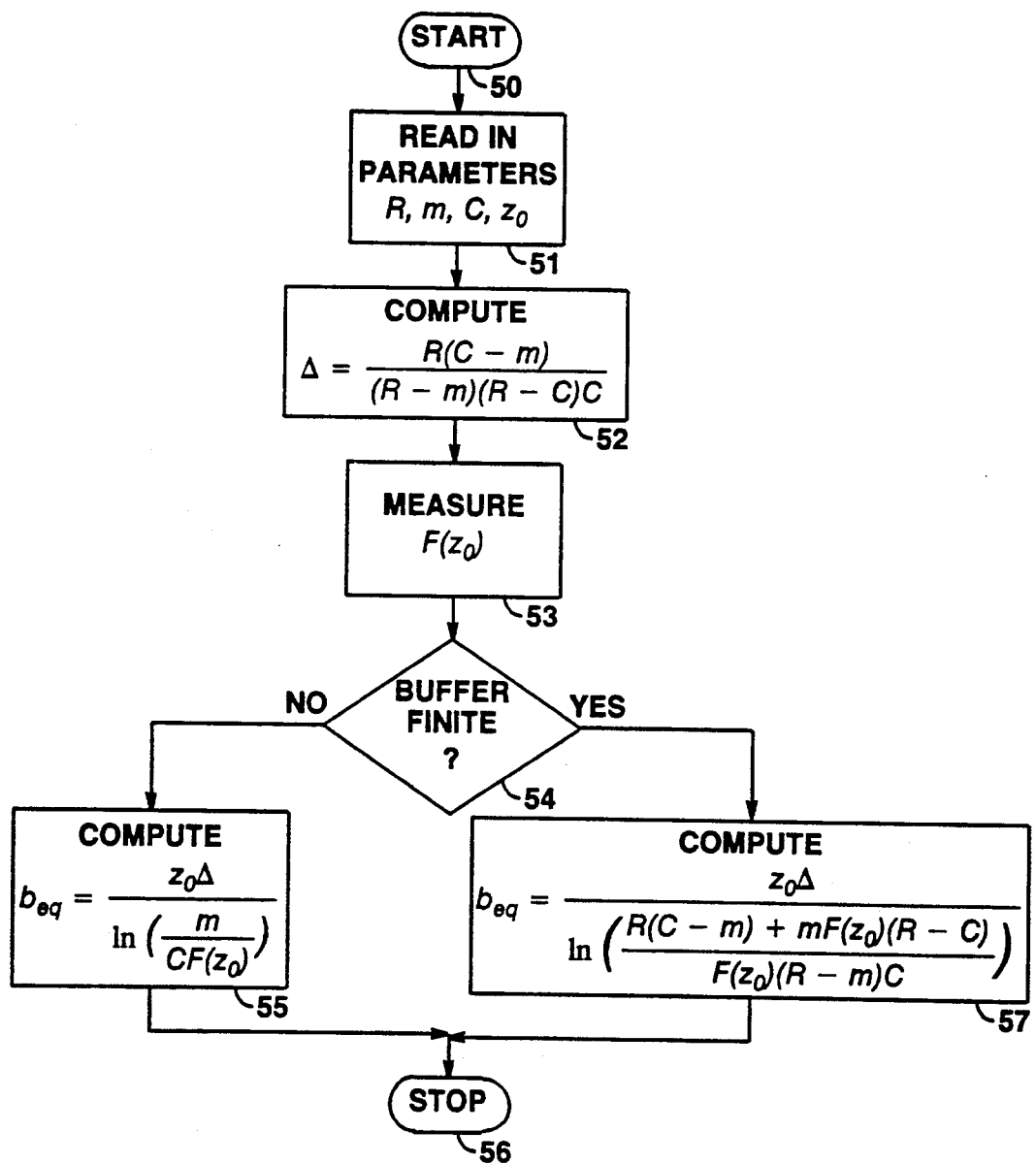
FIG. 6 shows a detailed flow chart for determining the equivalent burst length parameter in accordance with the present invention.

As an example of a specific embodiment of the present invention, in FIG. 6 there is shown a flow chart of the process for determining the equivalent burst length in a network access controller such as controller 39 in FIG. 2. It is assumed that the access controller is a leaky bucket mechanism. Starting in start box 50, box 51 is entered where the values of R, m, C, and $z_0$ are read into the controller. These values represent the peak pulse rate of the incoming traffic (R), the mean pulse rate of the incoming traffic (m), the rate at which tokens are generated and entered into the token pool (C), and the size of the token pool ($z_0$). These values are provided by the traffic source and can be measured readily by simply observing the incoming traffic over a period of time.

In box 52, the value of $\Delta$ is computed as defined in equation (1). In box 53, the value of the probability $F(z_0)$, representing the probability that the token buffer is empty, is measured. Decision box 54 is then entered to determine whether or not the admissions buffer is finite, i.e., of a length which is not adequate to store all of the offered traffic before transmission. In the case of a leaky bucket mechanism, box 54 determines whether or not violation tagging is being used at the leaky bucket. That is, it is determined whether or not the leaky bucket mechanism uses a tagging approach to deal with excess incoming traffic. If yes, the operation of the token buffer emulates a buffer queue with a finite length and box 57 is entered to calculate the value of the equivalent burst length $b_{eq}$ according to equation (4). If, on the other hand, violation tagging is not being used and packets are merely queued at the admissions buffer when insufficient tokens are available, the operation of the token buffer emulates an infinite buffer queue length and box 55 is entered to calculate $b_{eq}$ according to equation (2). In either case, the procedure is terminated in terminal box 56.

It can be seen that using the procedure of FIG. 6 in the access controller 39 of FIG. 2 allows well known prior art network access and bandwidth management techniques to continue to be used, and still obtain the benefit of traffic characterizations which much more accurately map into traffic burst length and idle period distributions which are not exponential and which may be correlated. Prior art burst length representations assume on/off, uncorrelated distributions of such burst lengths and idle periods, a condition which often does not occur. As a result, much more accurate access control and bandwidth management decisions are made using the equivalent burst length characteristic of the present invention.

It should also be clear to those skilled in the art that further embodiments of the present invention may be made by those skilled in the art without departing from the teachings of the present invention.

What is claimed is:

1. A network access control system for packet communications networks comprising a plurality of sources of digital traffic for transmission on one of said networks, means for characterizing said digital traffic incoming to said one of said communications networks by the peak bit rate of said digital traffic, the mean bit rate of said digital traffic, and the burst length of said digital traffic, means for determining the loss probability distribution of said digital traffic, means responsive to said distribution determining means for determining an equivalent burst length for said digital traffic having the same peak and mean bit rates and producing said loss probability distribution under the assumption that the burst and idle period distribution of said digital traffic is exponential and uncorrelated, and means utilizing said equivalent burst length for controlling the access of said digital traffic to said one network.

2. The network access control system according to claim 1 further comprising an admissions buffer which is essentially infinite in length in comparison to said digital traffic for connecting each of said sources to said one of said networks.

3. The network access control system according to claim 2 wherein said means for determining an equivalent burst length determines the equivalent burst length $b_{eq}$ according to the formula $$b_{eq} = \frac{z_0 \Delta}{\ln\left(\frac{m}{CF(z_0)}\right)}.$$

where $$\Delta = \frac{R(C - m)}{(R - m)(R - C)C}$$

and where
$z_0$ is the length of said admissions buffer, $F(z_0)$ is the value of said loss probability at said length $z_0$, R is said peak bit rate, m is said mean bit rate, and C is the transmission rate into said network.

4. The network access control system according to claim 1 further comprising
an admissions buffer which is finite in comparison to said digital traffic for connecting each of said sources to said one of said networks.

5. The network access control system according to claim 4 wherein said means for determining an equivalent burst length determines the equivalent burst length $b_{eq}$ according to the formula $$b_{eq} = \frac{z_0 \Delta}{\ln\left(\frac{R(C - m) + mF(z_0)(R - C)}{F(z_0)(R - m)C}\right)}.$$

where $\Delta$ is given by $$\Delta = \frac{R(C - m)}{(R - m)(R - C)C}$$

and where
$z_0$ is the length of said admissions buffer, $F(z_0)$ is the value of said loss probability at said length $z_0$, R is said peak bit rate, m is said mean bit rate, and C is the transmission rate into said network.

6. A packet communications network including a network access control system comprising
a plurality of sources of digital traffic for transmission on said network,
means for characterizing said digital traffic incoming to said communications network by the peak bit rate of said digital traffic, the mean bit rate of said digital traffic, and the burst length of said digital traffic,
means for determining the loss probability distribution of said digital traffic,
means responsive to said distribution determining means for determining an equivalent burst length for said digital traffic having the same peak and mean bit rates and producing said loss probability distribution under the assumption that the burst and idle period distribution of said digital traffic is exponential and uncorrelated, and means utilizing said equivalent burst length for controlling the access of said digital traffic to said network.

7. The packet communications network according to claim 6 further comprising
an admissions buffer which is essentially infinite in length in comparison to said digital traffic for connecting each of said sources to said network.

8. The packet communications network according to claim 7 wherein said means for determining an equivalent burst length determines the equivalent burst length $b_{eq}$ according to the formula $$b_{eq} = \frac{z_0 \Delta}{\ln\left(\frac{m}{CF(z_0)}\right)}.$$

where $$\Delta = \frac{R(C - m)}{(R - m)(R - C)C}$$

and where
$z_0$ is the length of said admissions buffer, $F(z_0)$ is the value of said loss probability at said length $z_0$, R is said peak bit rate, m is said mean bit rate, and C is the transmission rate into said network.

9. The packet communications network according to claim 6 further comprising
an admissions buffer which is finite in comparison to said digital traffic for connecting each of said sources to said network.

10. The packet communications network according to claim 9 wherein said means for determining an equivalent burst length determines the equivalent burst length $b_{eq}$ according to the formula $$b_{eq} = \frac{z_0 \Delta}{\ln\left(\frac{R(C - m) + mF(z_0)(R - C)}{F(z_0)(R - m)C}\right)}.$$

where $\Delta$ is given by $$\Delta = \frac{R(C - m)}{(R - m)(R - C)C}$$

and where
$z_0$ is the length of said admissions buffer, $F(z_0)$ is the value of said loss probability at said length $z_0$, R is said peak bit rate, m is said mean bit rate, and C is the transmission rate into said network.

11. A method for controlling network access to a packet communications network comprising
characterizing digital traffic incoming into said communications network by the peak bit rate for said digital traffic, the mean bit rate for said digital traffic, and the burst length for said digital traffic,
determining the loss probability distribution of said digital traffic,
in response to said step of distribution determination, determining an equivalent burst length for said digital traffic having the same peak and mean bit rates and producing said loss probability distribution under the assumption that the burst and idle period distribution of said digital traffic is exponential and uncorrelated, and utilizing said equivalent burst length for controlling the access of distribution said digital traffic to said one network.

12. The method of controlling network access according to claim 11 further comprising the step of storing said digital traffic in an admissions buffer which is essentially infinite in length in comparison to said digital traffic.

13. The method of controlling access according to claim 12 further comprising the step of determining the equivalent burst length $b_{eq}$ according to the formula $$b_{eq} = \frac{z_0 \Delta}{\ln\left(\dfrac{m}{CF(z_0)}\right)}.$$

where $$\Delta = \frac{R(C - m)}{(R - m)(R - C)C}$$

and where $z_0$ is the length of said admissions buffer, $F(z_0)$ is the value of said loss probability at said length $z_0$, R is said peak bit rate, m is said mean bit rate, and C is the transmission rate into said network.

14. The method of controlling access according to claim 11 further comprising the step of storing said digital traffic in an admissions buffer which is finite in comparison to said digital traffic.

15. The method of controlling access according to claim 14 further comprising the step of determining the equivalent burst length $b_{eq}$ according to the formula $$b_{eq} = \frac{z_0 \Delta}{\ln\left(\dfrac{R(C - m) + mF(z_0)(R - C)}{F(z_0)(R - m)C}\right)}.$$

where $\Delta$ is given by $$\Delta = \frac{R(C - m)}{(R - m)(R - C)C}$$

and where $z_0$ is the length of said admissions buffer, $F(z_0)$ is the value of said loss probability at said length $z_0$, R is said peak bit rate, m is said mean bit rate, and C is the transmission rate into said network.

* * * * *